(12) United States Patent
McGrath

(10) Patent No.: US 11,867,908 B2
(45) Date of Patent: Jan. 9, 2024

(54) FOLDED OPTIC AUGMENTED REALITY DISPLAY

(71) Applicant: BAE SYSTEMS Information and Electronic Systems Integration Inc., Nashua, NH (US)

(72) Inventor: R. Daniel McGrath, San Jose, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/554,603

(22) Filed: Dec. 17, 2021

(65) Prior Publication Data

US 2023/0194867 A1 Jun. 22, 2023

(51) Int. Cl.
*G02B 27/01* (2006.01)
*H04N 13/332* (2018.01)
*G02B 30/35* (2020.01)
*H04N 23/80* (2023.01)
*H04N 23/90* (2023.01)
*G02B 30/36* (2020.01)

(52) U.S. Cl.
CPC ......... *G02B 27/0172* (2013.01); *G02B 30/35* (2020.01); *H04N 13/332* (2018.05); *H04N 23/80* (2023.01); *H04N 23/90* (2023.01); *G02B 30/36* (2020.01); *G02B 2027/014* (2013.01); *G02B 2027/0134* (2013.01); *G02B 2027/0138* (2013.01)

(58) Field of Classification Search
CPC ...... H04N 13/332; H04N 23/80; H04N 23/90; G02B 27/0172; G02B 30/35; G02B 30/36; G02B 2027/0134; G02B 2027/0138; G02B 2027/014
See application file for complete search history.

(56) References Cited

U.S. PATENT DOCUMENTS

| 4,961,626 | A | 10/1990 | Fournier, Jr. et al. |
| 5,867,313 | A | 2/1999 | Schweitzer et al. |
| 6,560,029 | B1 | 5/2003 | Dobbie et al. |
| 8,482,859 | B2 | 7/2013 | Border et al. |
| 11,102,602 | B1 * | 8/2021 | Brimijoin ............... G06F 3/165 |
| 11,550,153 | B2 * | 1/2023 | Gao ....................... G02B 13/18 |

(Continued)

*Primary Examiner* — Lin Ye
*Assistant Examiner* — John H Morehead, III
(74) *Attorney, Agent, or Firm* — Maine Cernota & Curran; Gary McFaline

(57) ABSTRACT

A digital imaging system is provided with direct view of an object, having: an optical element configured to allow visible light to pass therethrough to a user's eye and to redirect light of non-visible wavelengths away from the user's eye; a display disposed between the user's eye and the object; a digital camera mounted outside a field of view of the user's eye and configured to obtaining imaging data from the light of non-visible wavelength; a redirection optic disposed so as to redirect the light of non-visible wavelength to the digital camera; and an image processor configured to process the imaging data from the digital camera and output the data to the display such that an image generated from the imaging data from the digital camera overlays an image produced by the impingement of visible light on the user's eye following the visible light's passing through the optical element.

20 Claims, 7 Drawing Sheets

(56) References Cited

U.S. PATENT DOCUMENTS

| | | | |
|---|---|---|---|
| 2012/0062445 A1 | 3/2012 | Haddick et al. | |
| 2014/0063055 A1 | 3/2014 | Osterhout et al. | |
| 2015/0062531 A1* | 3/2015 | Buckland | G02B 21/0012 359/363 |
| 2016/0377868 A1* | 12/2016 | Ouderkirk | G02B 6/0046 359/485.01 |
| 2018/0084232 A1 | 3/2018 | Belenkii et al. | |
| 2019/0012540 A1* | 1/2019 | Trail | H04N 23/11 |
| 2020/0150408 A1* | 5/2020 | Fard | G02B 17/086 |
| 2020/0159030 A1* | 5/2020 | Ayres | G02B 27/0172 |
| 2021/0132384 A1* | 5/2021 | Liao | G02B 27/0093 |
| 2021/0266474 A1* | 8/2021 | Sharma | G02B 27/0093 |
| 2021/0325677 A1* | 10/2021 | Gao | G02B 27/0093 |
| 2021/0405363 A1* | 12/2021 | Canberk | G02B 27/0101 |
| 2021/0406542 A1* | 12/2021 | Canberk | G06V 40/20 |
| 2021/0407203 A1* | 12/2021 | Canberk | G06F 3/013 |

* cited by examiner

FOLDED OPTIC AUGMENTED REALITY DISPLAY

FIELD OF THE DISCLOSURE

The following disclosure relates generally to augmented reality goggles, and more specifically to parallax-free night vision optics.

BACKGROUND

The human eye has evolved to be responsive to the light provided by the sun, which provides energy in what is known as the 'visible' wavelengths. The light originates from the sun or from man-made illumination devices that produce photons, preferentially in these same wavelengths. At night without man-made light sources, the illumination photon spectrum shifts to longer wavelengths, with the principle illuminate being from air glow produced when molecules high in the atmosphere that were excited by daylight now relax to a lower energy state, producing photons predominately in the 'near infrared' and 'short wavelength infrared' wavelengths. The primary challenge of man-portable night vision systems is to make use of these 'non-visible' wavelengths to provide visual information to the human observer.

Known augmented reality night vision systems predominantly utilize helmet mounted image intensifier systems, which are both bulky and introduce parallax distortion unless the augmented images are carefully aligned with the visible light image displayed.

More specifically, such systems typically use a direct-view image intensifier tube 8, as illustrated in FIG. 1, that amplifies and converts the photons in the 'near-infrared' wavelengths into visible light on a fluorescent, direct view screen. Unfortunately, this method requires the suspension of heavy optical devices and moves the optical plane forward leading to optical parallax for near objects. The image is also only visible to the person wearing the intensifier tube.

An alternative known system uses a 'non-visible' camera, as illustrated in FIGS. 2 and 3. For such a camera to not obstruct the direct view of the observer, they are mounted out of the optical axis of the observer's eye. This results in significant parallax. The physical size also places the focal plane forward of the viewer's eye, resulting in further parallax between the physical location and the perceived location of objects.

A final alternative involves the digital capture of data to overcome the limitations of the aforementioned prior designs. Digital prior art solutions, however, involve either placing the imaging device in front of the eye, blocking direct viewing of the scene, or beside the eye resulting in the parallax issue. This results in the need to physically move the optical system in and out of the line of sight as light conditions change in the viewed scene (e.g., where the evolving scene includes lamps or headlights or where the user chooses to intermittently use a flashlight.) Digital solutions also have the downsides of increased complexity, which tends to lead to increased failure rates and cost, and energy usage.

What is needed, therefore, is a night vision system that is able to harness non-visible light and use it to generate a visible light image that does not suffer from parallax issues or require the implementation of a digital solution to the problems faced by the prior designs.

SUMMARY

An exemplary embodiment of the present disclosure provides a system including a combination of direct visual viewing of the surroundings merged with viewing of features not directly viewable by the human eye. This can be further enhanced with information extracted from the scene, as viewed by the cameras.

In embodiments, the system uses folded optics to reduce the issue of parallax by providing the same optical perspective for the imagery.

Particular implementations may include one or more of the following features: operability at night or in other low-light level environments; augmented reality for games, visual assist for industrial purposes, safety in challenging environments such as military operations; and enhanced safe operation of bicycle, scooter, or vehicle.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and from the claims.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

These and other features of the present embodiments will be understood better by reading the following detailed description, taken together with the figures herein described. The accompanying drawings are not intended to be drawn to scale. For purposes of clarity, not every component may be labeled in every drawing.

DETAILED DESCRIPTION

As a preliminary matter, the phrases "direct view" and "direct view optics", as used herein, are intended to refer to a class of sensors that include the human eye and the human eye coupled to rifle scopes, spotter scopes, binoculars, telescopes, night vision systems, and the like. The target acquisition model for direct view optics is based on the contrast threshold function of the eye with a modification for the optics modulation transfer function and the optical magnification.

Provided herein is a night vision system that is able to harness non-visible light and use it to generate a visible light image that does not suffer from parallax issues or require the implementation of a digital solution to the problems faced by the prior designs. Non-visible light could either be light of non-visible wavelength, or light of a visible wavelength that is of intensity below the threshold of light detectable by the human eye. Embodiments of the present disclosure find use in many augmented reality and virtual reality applications by providing imagery from the user's viewpoint while simultaneously allowing the user to function using his normal sight. Exemplary, non-limiting, applications include operability at night or in other low-light-level environments; providing augmented reality for games, visual assist for industrial purposes, safety in challenged environments, and enhanced safe operation of vehicles; and other applications, as would be apparent to one of ordinary skill in the art.

Figure 1:
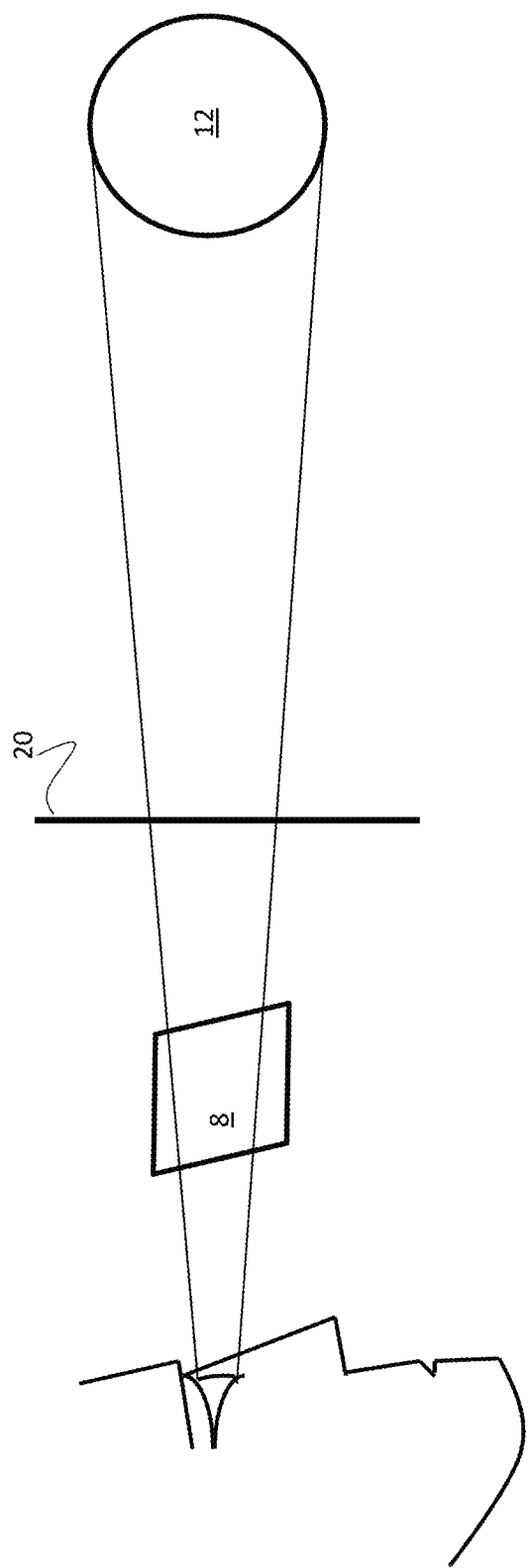
FIG. 1 is a right-side elevation view of a direct view image intensifier system configured according to known techniques.
Figure 2:
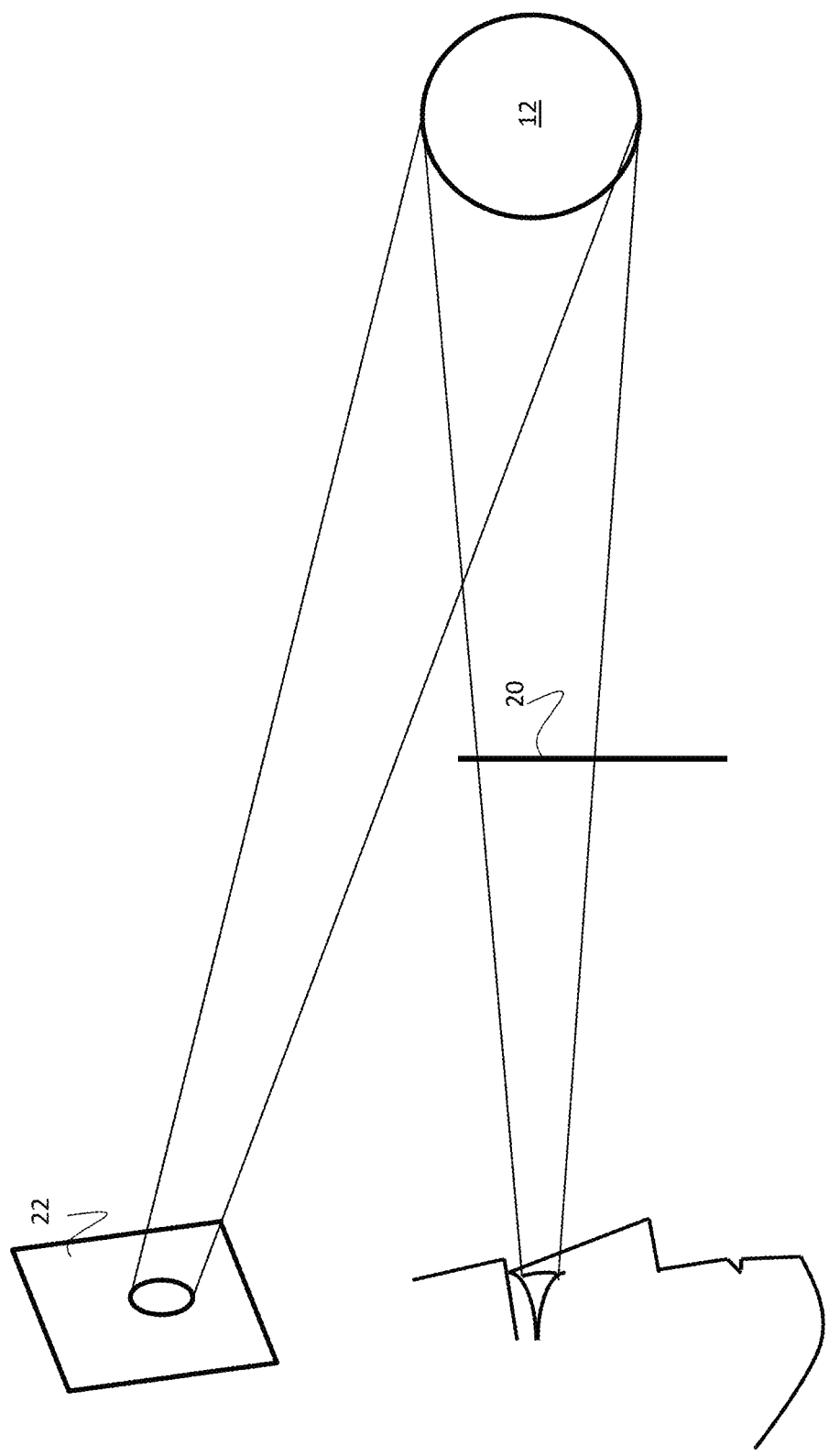
FIG. 2 is a right side elevation view showing a non-visible camera system according to known techniques.
Figure 3:
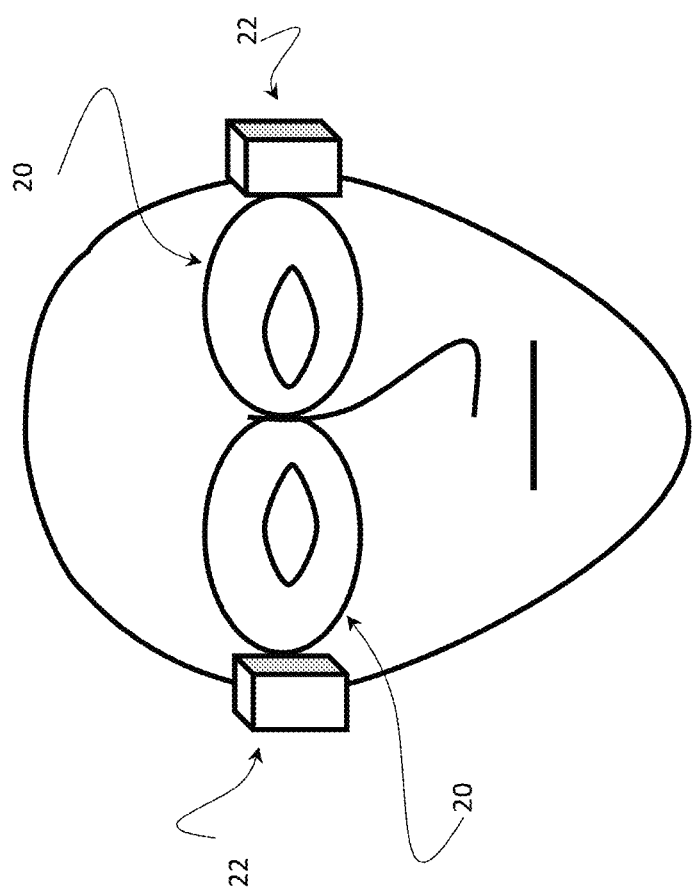
FIG. 3 is a front elevation view of a non-visible camera system according to known techniques.
Figure 4:
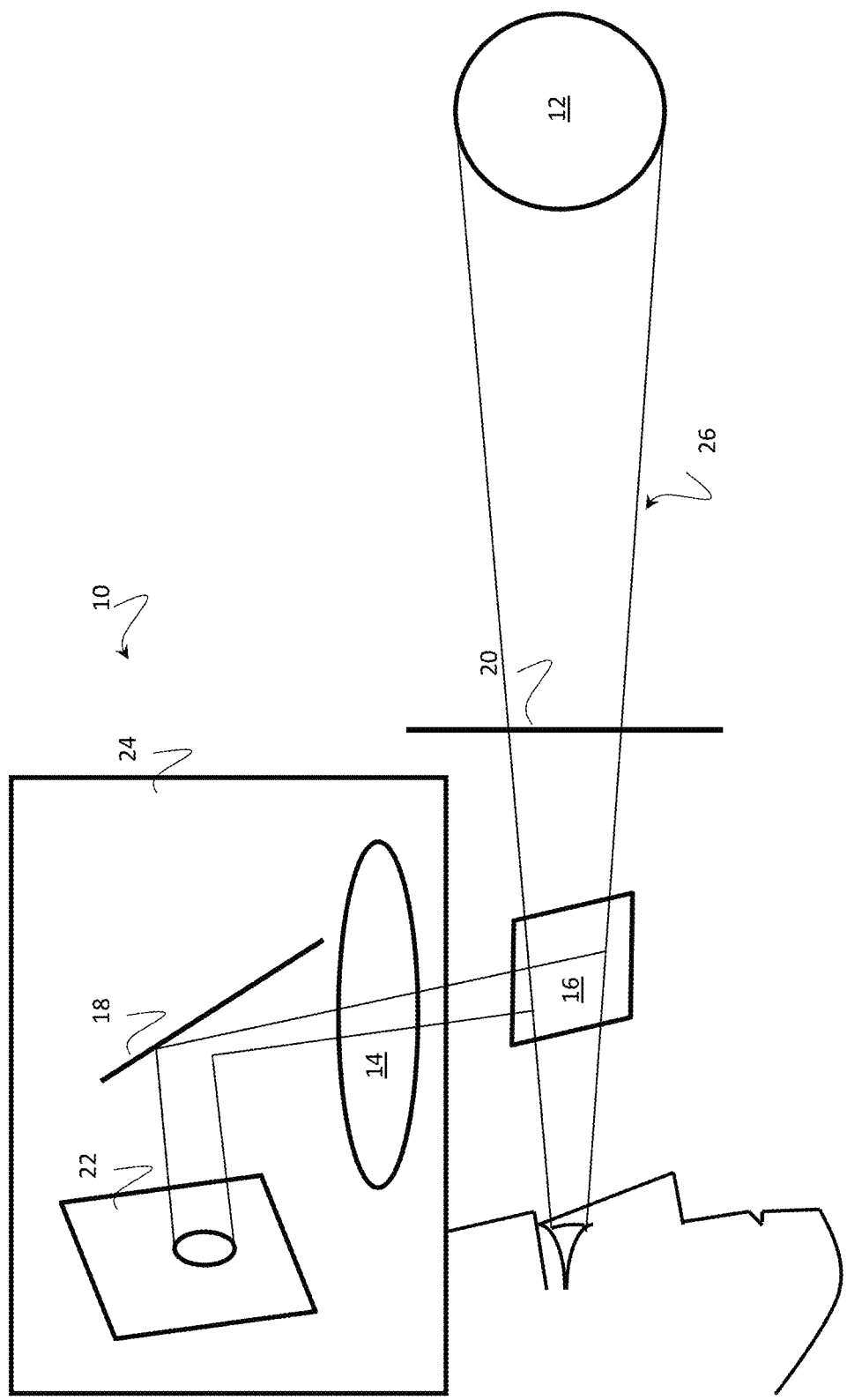
FIG. 4 is a right side elevation view of a folded optic augmented reality system configured in accordance with embodiments of the present disclosure.
Figure 5:
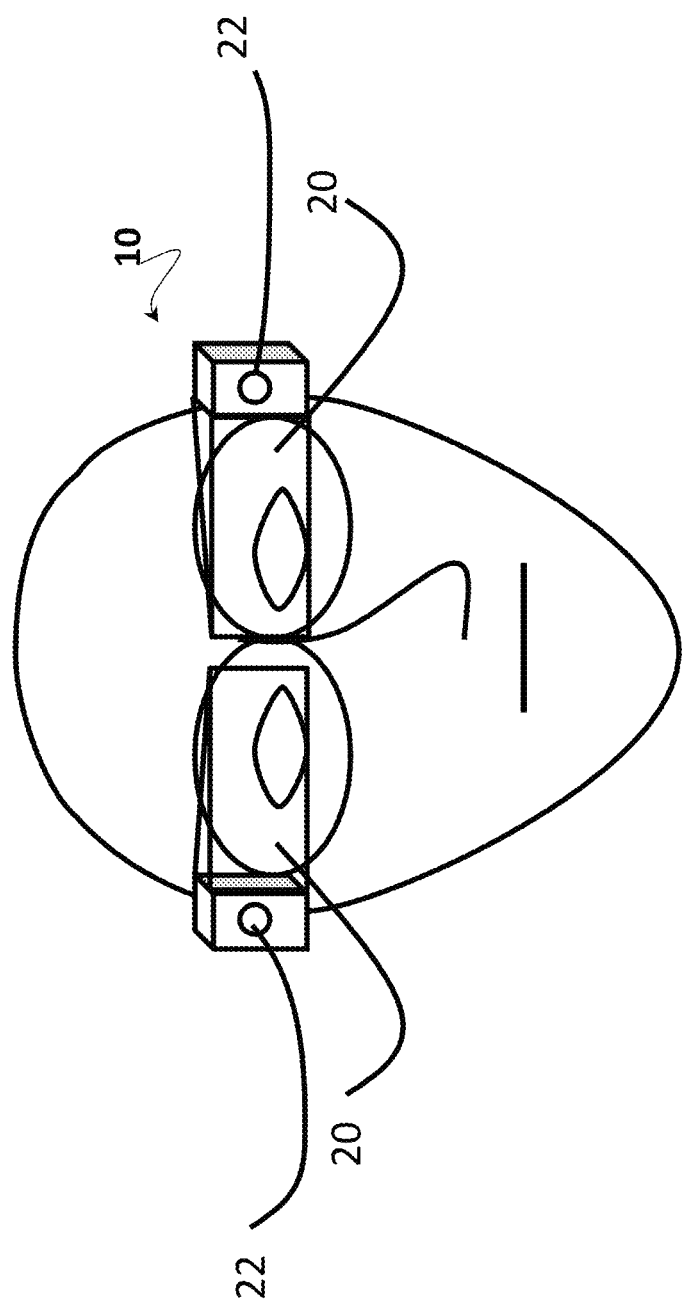
FIG. 5 is a front elevation view of a folded optic augmented reality system configured in accordance with embodiments of the present disclosure.

Now referring to FIGS. 4 and 5, a wearable augmented reality goggle system 10 including at least one digital camera or image capture unit having a direct view of a scene 12, the combination yielding an augmented reality night vision system, is shown. Such a system, in embodiments, is configured to provide parallax-free viewing directly to the eye, allowing for brighter scenes, which can additionally be enhanced through the use of images provided by an image sensor 22, without the need for a helmet-mounted image intensifier tube.

As illustrated in FIGS. 4 and 5 the augmented reality wearable system 10 of embodiments comprises a head-mounted optic with a beam-splitter optical element 16 that is configured to pass visible light while directing near infrared light to the side; a heads-up display 20 in the line of sight configured to display imagery from digital sources while allowing visible light to pass through; a relay optic 14 configured to enhance and/or amplify light passing therethrough; a redirection optic 18 configured to direct near infrared light to an image-capture unit 22 located beside the head or elsewhere on the user; the image-capture unit 22, as familiar to one skilled in the art, being sensitive in the near-infrared or short-wavelength-infrared is, in some embodiments mounted proximal to the head and provides imaging data; and an image processing unit 24 configured to enhance the image and provide it to the heads up display 20. In an exemplary embodiment, there is electrical, optical, or electro-optical wiring in the goggles that couples the output of the image processing unit to the display 20. In other embodiments, a wireless communications link, such as a radio link, is used. Visible light may, in embodiments, pass directly through the beam splitter optical element.

Figure 7:
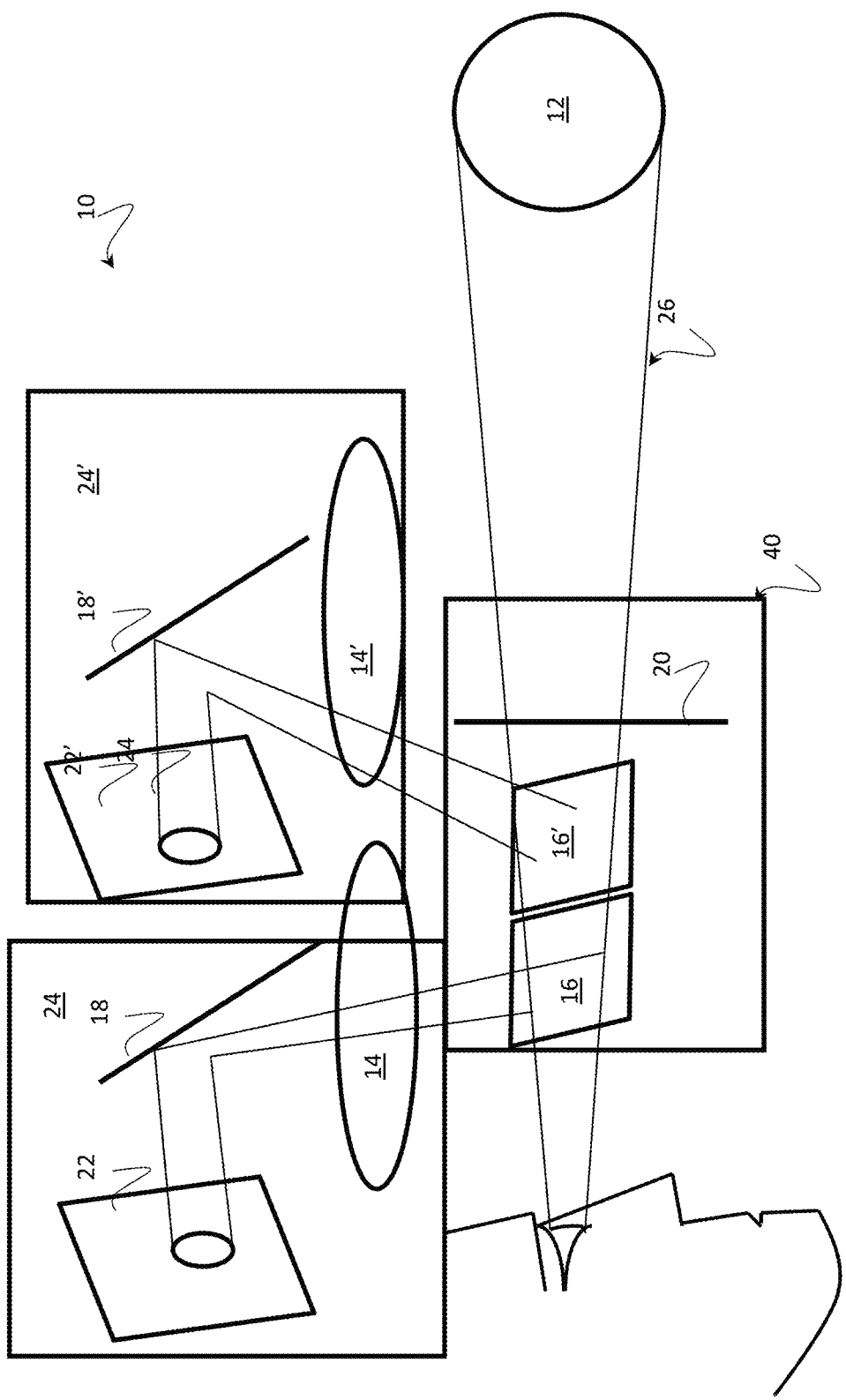
FIG. 7 is a right side elevation view of a folded optic augmented reality system having an integrated heads-up display and optical element subsystem configured in accordance with embodiments of the present disclosure.

Similarly, image capture unit 22 may be configured to capture information from visible light being at an integrated photon flux level at or below equivalent starlight scene illumination. Suitable redirection optics 18 include, but are not limited to, folded fiber optics, mirrors, endoscopic or borescope lenses, light pipes, and such other optical elements capable of changing the direction of light as are known to one skilled in the art. The beam splitter optical element 16 is, in some embodiments, a single element providing the splitting of light into visible and non-visible wavelengths. Alternatively, multiple lenses, mirrors, holographic, or light guiding elements may be employed to achieve the same splitting characteristics. Examples also include a glass inserted at an angle to the line of sight with an optical coating that is transmissive in visible and reflective in near-infrared or short-wavelength infrared. One skilled in the art may recognize that heads up display 20 and optical element 16 may be provided as separate components as in FIG. 4, but may appear as an integrated or unitary system to an end user. Alternatively, the two could be integrated into a single subsystem 40, as illustrated in FIG. 7. The system can be viewed as two subsystems: a unit in the line of sight of the observer 26 comprised of the beam-splitter optical element 16 and the heads up display 20; an image processing unit 24 comprising relay optics 14, redirection optic 18 and image-capture unit 22.

Referring to FIG. 5, the optical element 16 is part of the heads up display 20 and allows certain spectrum of energy to pass thru the heads up display 20 to the eye and redirect certain spectrum to the image capture unit 22, which may be a camera. In the depicted example there are two image capture units 22, but, in a further example, a single image capture unit 22 is utilized. Additional embodiments may utilize more than two image capture units 22.

In embodiments, the augmented reality wearable system is integrated into a network, providing for the sharing of imaging data and allowing other users to access and view images using both visible and non-visible spectra in real time and/or from recordings from the perspective of the wearer. Such systems may be configured with video recording and sharing functionality in a manner familiar to those skilled in this art.

In embodiments, referring again to FIG. 4, optical element 16, and redirection optic 18 allow for folding the light path and include mirrors, prisms, holographic elements, and such other optical elements, as would be known to one of ordinary skill in the art.

In other embodiments, the light may be split by the optical element 16 in such a way that a portion of the light is split from the direct view and directed to the image capture unit 22. A perfect spectral split is not necessary for operation of such a system; such a split must, however, allows for adequate light of an appropriate wavelength to reach the image capture unit 22 to provide detection of sufficient discrimination to be useful to the user. The image capture unit 22 of such an embodiment may be a digital camera.

In embodiments, the goggles 10 are stereoscopic, however, one of ordinary skill in the art will recognize that a monocular embodiment, e.g. a single eyepiece coupled with a single camera, would likewise be beneficial in some applications.

Embodiments may be utilized in augmented reality systems where visible, direct view of a scene benefits from being augmented by non-visible imagery (that is, imagery outside of the visible scene) or where visible imagery is complemented by information obtained from visible or non-visible imagery with processing (for instance, object identification).

One skilled in the art would appreciate that while some embodiments may seek to enhance near wavelength infrared (NWIR), other infrared wavelengths, such as short wavelength infrared (SWIR) and long wavelength infrared (LWIR), and other wavelengths, both outside of and within the visible and infrared wavelength bands, could also be enhanced through the implementation of the teachings of the present disclosure.

Furthermore, a person of ordinary skill in the art would appreciate that embodiments are not limited to head-mounted displays and, in embodiments, include any compatible display.

Figure 6:
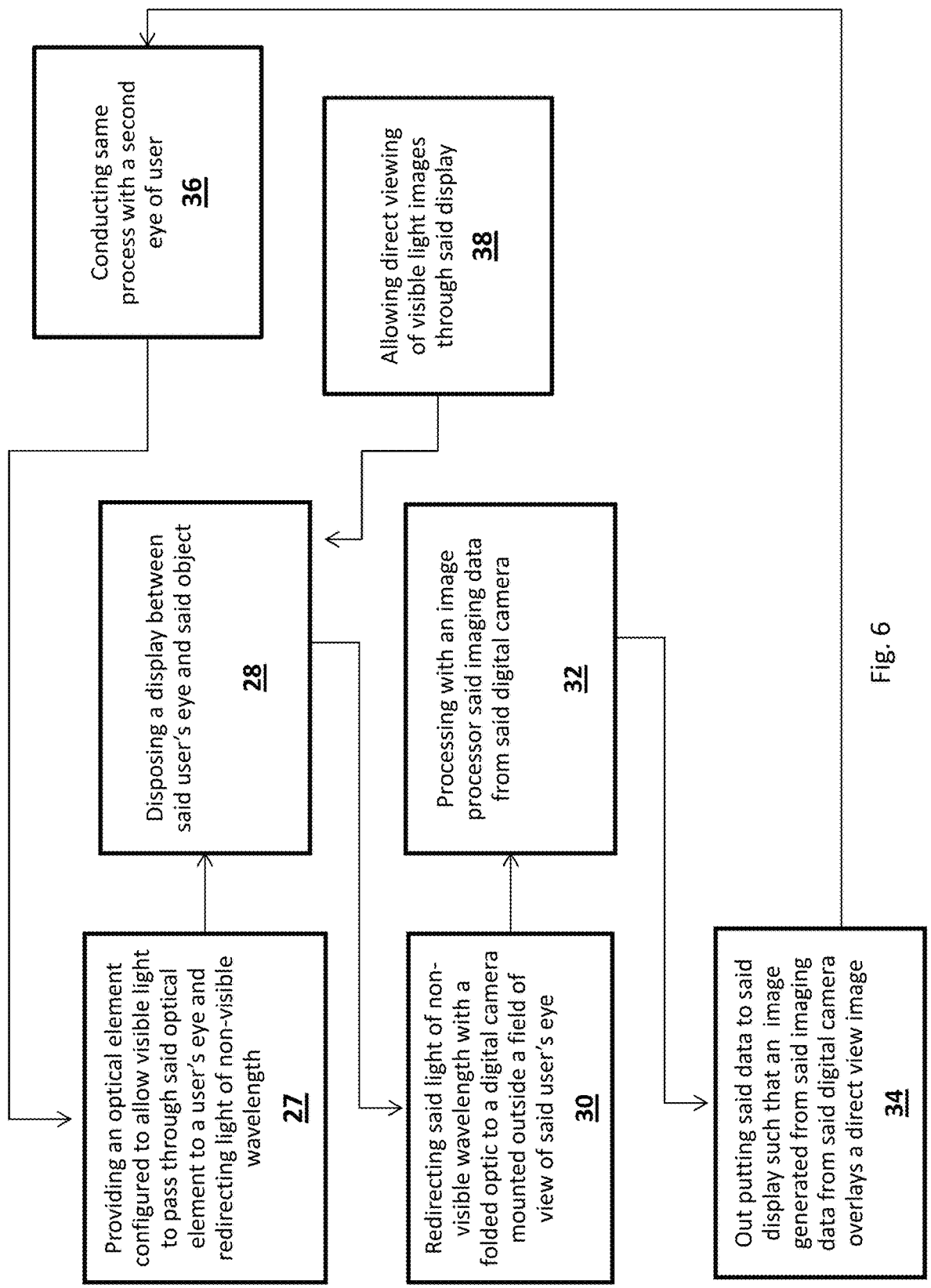
FIG. 6 is a flow chart illustrating a method for augmented reality display configured in accordance with embodiments of the present disclosure.

As illustrated in FIG. 6, embodiments provide methods for displaying a digital image superimposed on a direct image. In such a method, one provides an optical element 16 configured to allow visible light to pass therethrough to a user's eye while redirecting light of non-visible wavelength 27 away from the user's eye. In embodiments, this is accomplished by disposing a display 20 between the user's eye and the object 28 and using a folded optic to redirect the light of non-visible wavelength to a digital camera mounted outside a field of view of the user's eye 30. The image capture device 32 imaging data obtained from the light of non-visible wavelength is then, in embodiments, processed using an image processor. In embodiments, the data is then output to the display located in front of the user's eye via wired, wireless, or fiber optic connection or other suitable communication protocol, such that an image generated from the imaging data from said image capture device 32 overlays a direct view image 34. Image processing provides for a seamless transition between visible and non-visible image data provided to the user. Image processing may also provide overlays of features or information of interest to the user. For example, symbology and data can be displayed such as news feeds, directional arrows, email/text messages and similar.

Embodiments of such a method provide direct viewing of visible light images through the display 38.

In embodiments where binocular imaging is desirable, the method is applied simultaneously to both eyes of a user 36. As noted above, the wavelength of the non-visible light may be from a variety of spectra, including, but not limited to, near wavelength infrared, short wavelength infrared, and such other spectra as one skilled in the art would know to use for a particular application.

Referring to FIG. 7, a dual image capture unit 22, 22' embodiment shows the heads up display 20 and optical elements 16, 16' are integrated as a single subsystem 40, such that a section of the display 20 functions as a beam splitter to pass visible spectra energy directly through to the user while directing some portion of non-visible wavelength spectra energy to dual image processing units 24, 24' having the relay optics 14, 14' and to the redirection optics 18, 18' and eventually to the image-capture units 22, 22'. This dual image capture unit approach allows for binocular embodiments with redirection optics 16, 16' disposed next to each other in front of the user's respective eyes.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. A digital imaging system with direct view of an object, comprising:
   an optical element configured to allow visible light to pass therethrough to a user's eye and to redirect, prior to reaching the user's eye, at least some light of non-visible wavelengths away from said user's eye;
   a redirection optic disposed so as to redirect said at least some light of non-visible wavelength;
   an image capture unit mounted outside a field of view of said user's eye, within a path of said at least some light of non-visible wavelength;
   a display disposed between said user's eye and said object; and
   an image processor configured to process imaging data from said image capture unit and output said imaging data to said display such that an image generated from said imaging data from said digital camera overlays an image produced by impingement of visible light on the user's eye following the visible light's passing through the optical element, wherein the image generated from said imaging data comprises visible light passing through the optical element and non-visible light captured by the image capture unit.

2. The digital imaging system of claim 1 wherein said at least some light of non-visible wavelengths is near infrared light.

3. The digital imaging system of claim 1 wherein said at least some light of non-visible wavelengths is shortwave infrared light.

4. The digital imaging system of claim 1, wherein said digital camera is disposed on a side of the user's head.

5. The digital imaging system of claim 1 wherein said light of non-visible wavelength is from visible light being at an integrated photon flux level at or below equivalent starlight scene illumination.

6. The digital imaging system of claim 5, wherein said redirection optic comprises a redirection optic selected from the group consisting of a folded fiber optic, mirror, endoscopic lens, borescope lens, and light pipe.

7. The digital imaging system of claim 1 wherein said image processor processing also includes additional information that is mapped onto a viewed image.

8. The digital imaging system of claim 1, wherein said optical element is a beam-splitter mirror.

9. The digital imaging system of claim 1 wherein said optical element permits only visible light to pass therethrough.

10. The digital imaging system of claim 1 wherein said optical element permits light of both visible and invisible spectra to pass through to said user's eye and directs light of both visible and invisible spectra to said digital camera.

11. The digital imaging system of claim 1 further comprising a second optical element configured to allow visible light to pass therethrough to a user's second eye and to redirect at least some light of non-visible wavelength away from said user's second eye; and
   a second redirection optic disposed so as to redirect said at least some light of non-visible wavelength to a second digital camera, said second digital camera being mounted outside a field of view of said user's second eye and configured to obtain imaging data from said at least some light of non-visible wavelength redirected by said second optical element and said second redirection optic,
   wherein said image processor is configured to process said imaging data from both said digital cameras and output said data to said display such that an image generated from said imaging data from said digital cameras overlays an image produced by the impingement of visible light on each of the user's eyes following the visible light's passing through the optical element or second optical element.

12. The digital imaging system of claim 11, wherein said display is a single display disposed in front of the eyes of said user.

13. The digital imaging system of claim 11, wherein said display comprises a plurality of stereographic eyepieces.

14. A digital imaging system with direct view of an object, comprising:
- a beam-splitter mirror configured to allow light to pass through said mirror to a user's eye and to redirect, prior to reaching the user's eye, at least a portion of said light, said portion of said light having a non-visible wavelength;
- a digital display disposed between said user's eye and said object; and
- a folded optic disposed so as to redirect said at least a portion of said light of non-visible wavelength to a digital camera; and
- an image processor configured to process imaging data from said camera and to output said data to said display, allowing the imaging data to be viewed remotely, wherein the data output to said display from said imaging data comprises visible light passing through the beam-splitter mirror and non-visible light redirected by the folded optic to the digital camera,
- wherein said digital camera is mounted outside a field of view of said user's eye and configured to obtain imaging data from said light of non-visible wavelength.

15. A method for producing a digital image containing non-visible elements superimposed on a direct image containing visible elements, comprising:
- providing an optical element configured to allow visible light to pass therethrough to a user's eye and to redirect, prior to reaching the user's eye, light of non-visible wavelength away from said user's eye;
- disposing a display between said user's eye and an object within a field of view of the optical element;
- redirecting said light of non-visible wavelength to a digital camera mounted outside a field of view of said user's eye;
- obtaining with said digital camera imaging data from said light of non-visible wavelength;
- processing said imaging data from said digital camera using an image processor; and
- outputting said data to said display such that an image generated from said imaging data from said digital camera overlays an image produced by the impingement of visible light on the user's eye following the visible light's passing through the optical element, wherein the image generated from said imaging data comprises visible light passing through the optical element and non-visible light captured by the image capture unit.

16. The method of claim 15 wherein said method comprises allowing direct viewing of visible light images through said display.

17. The method of claim 15 wherein said method is applied to both eyes of said user.

18. The method of claim 15, wherein said non-visible light is near wavelength infrared.

19. The method of claim 15 wherein said non-visible light is short wavelength infrared.

20. The method of claim 15 wherein the redirecting of said light of non-visible wavelength to a digital camera mounted outside a field of view of said user's eye is accomplished using a folded optic.

* * * * *